(12) United States Patent
Nguyen

(10) Patent No.: US 6,932,923 B2
(45) Date of Patent: Aug. 23, 2005

(54) METHOD OF MAKING A MELT-BLOWN FILTER MEDIUM FOR USE IN AIR FILTERS IN INTERNAL COMBUSTION ENGINES AND PRODUCT

(75) Inventor: Ledu Q. Nguyen, Fayetteville, NC (US)

(73) Assignee: Arvin Technologies, Inc., Troy, MI (US)

( * ) Notice: Subject to any disclaimer, the term of this patent is extended or adjusted under 35 U.S.C. 154(b) by 87 days.

(21) Appl. No.: 10/379,467

(22) Filed: Mar. 3, 2003

(65) Prior Publication Data

US 2004/0172930 A1 Sep. 9, 2004

(51) Int. Cl.[7] .......................... D04H 3/16; B01D 39/16
(52) U.S. Cl. ................. 264/5; 264/6; 264/13; 264/165; 264/DIG. 48; 55/385.3; 55/521; 55/527; 55/528; 55/DIG. 5
(58) Field of Search ................. 55/385.3, 521, 55/527, 528, DIG. 5; 264/5, 6, 7, 8, 13, 109, 165, DIG. 48

(56) References Cited

U.S. PATENT DOCUMENTS

| 2,374,540 A | 4/1945 | Hall | |
|---|---|---|---|
| 4,177,312 A | * 12/1979 | Rasen et al. | 442/334 |
| 4,631,077 A | 12/1986 | Spicer et al. | |
| 4,824,451 A | * 4/1989 | Vogt et al. | 55/528 |
| 4,925,601 A | * 5/1990 | Vogt et al. | 264/6 |
| 5,271,883 A | * 12/1993 | Timmons et al. | 264/6 |
| 5,350,620 A | * 9/1994 | Sundet et al. | 55/527 |
| 5,407,739 A | 4/1995 | McCullough et al. | |
| 5,976,209 A | * 11/1999 | Choi | 55/528 |
| 6,139,608 A | 10/2000 | Woodbridge et al. | |
| 6,454,827 B2 | * 9/2002 | Takagaki et al. | 55/527 |
| 6,488,801 B1 | 12/2002 | Bodaghi et al. | |
| 6,554,881 B1 | * 4/2003 | Healey | 55/528 |
| 6,732,868 B2 | * 5/2004 | Takagaki et al. | 55/521 |
| 6,743,270 B2 | * 6/2004 | Oda et al. | 55/527 |
| 6,743,274 B2 | * 6/2004 | Takagaki | 55/527 |
| 6,758,877 B2 | * 7/2004 | Oda et al. | 55/521 |

FOREIGN PATENT DOCUMENTS

JP 8-38834 * 2/1996 .......... B01D/39/00

* cited by examiner

Primary Examiner—Duane Smith
Assistant Examiner—Jason M. Greene
(74) Attorney, Agent, or Firm—Carlson, Gaskey & Olds

(57) ABSTRACT

The present invention involves using a melt-blowing process to make a filter medium defining pores having a pore size of between 3 and 12 microns. The filter medium is made of a thermoplastic polymer and is adapted for use in an internal combustion engine air filter. A profile is used in the melt-blowing process to mold melt blown fibers into the filter medium.

15 Claims, 4 Drawing Sheets

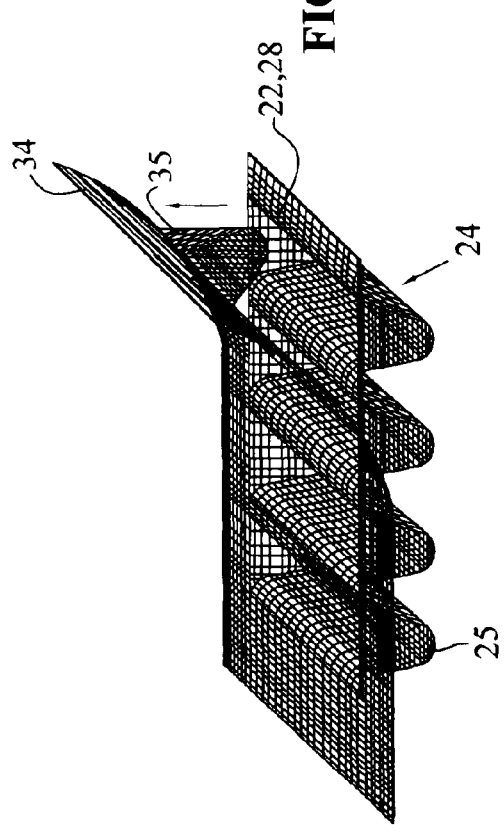
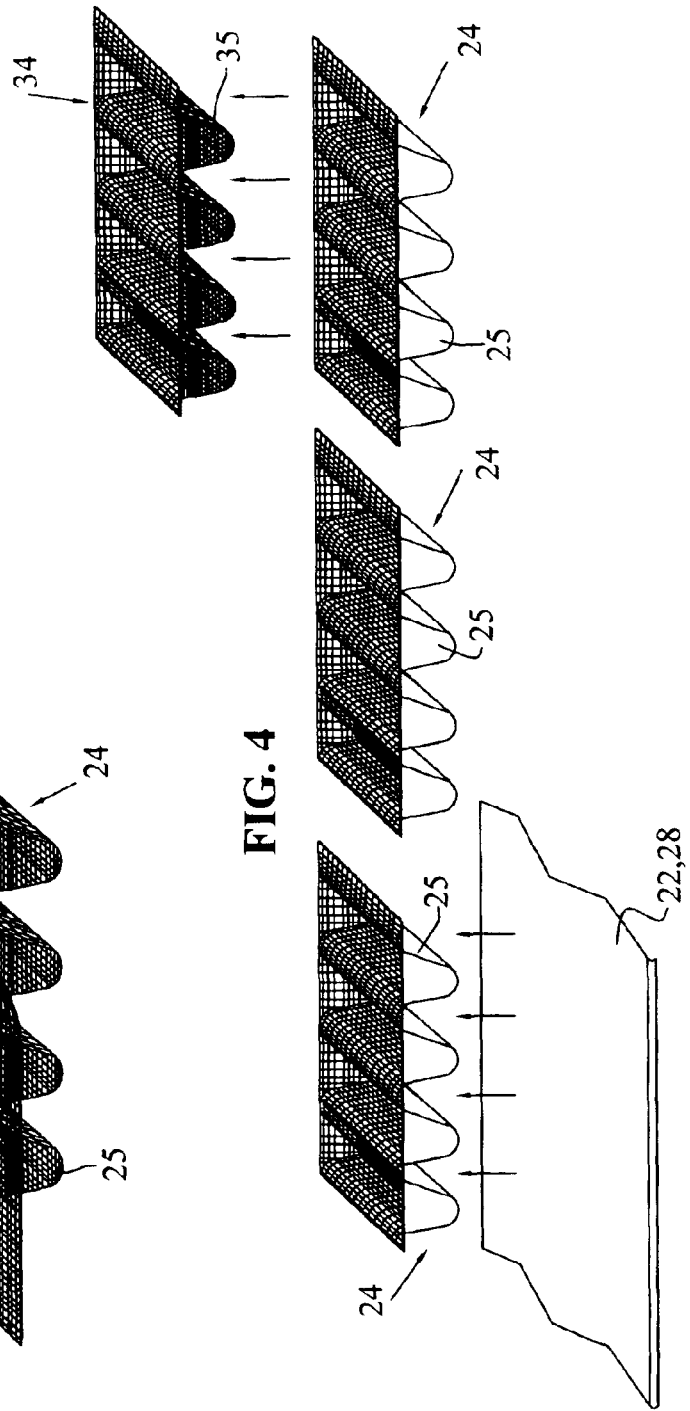

METHOD OF MAKING A MELT-BLOWN FILTER MEDIUM FOR USE IN AIR FILTERS IN INTERNAL COMBUSTION ENGINES AND PRODUCT

BACKGROUND OF THE INVENTION

1. Field of the Invention

The present invention relates to air filters used in internal combustion engines, specifically a method of making a filter medium adapted for use in such air filters.

2. Description of the Related Art

Fluid streams such as air and gas often carry particulate matter. Because it is desirable to remove the particulate matter from the fluid stream, the air streams flowing to internal combustion ("IC") engines generally need to be filtered before the particulate matter reaches the engine. In automobiles, air filters are used to filter the air streams and the air filters are commonly utilized upstream of the automobile's engine.

Air filters contain filter media that are often made of non-woven materials. A non-woven filter medium can be formed in a web by conventional non-woven techniques including melt-blowing, spunbonding, carding, air laying, wet laying, or the like. Melt-blown non-woven webs can be formed by the process generally taught in Wente, Van A., "Superfine Thermoplastic Fibers" in Industrial Engineering Chemistry, Volume 48, pages 1342–1346 (1956), or Report No. 4364 of the Naval Research Laboratories, published May 25, 1954, entitled "Manufacture of Superfine Organic Fibers" by Wente, Van A., Boone, C. D. and Feluharty, E. L. The melt-blowing process typically produces fine fibers with a diameter of less than ten (10) microns, and the use of the melt-blowing process allows the non-woven material to be formed in one step from a resin to a melt-blown non-woven material.

Melt-blown materials have found utility in a broad range of applications. For example, it is known to use melt-blown filaments in the preparation of battery separators, cable wrap, capacitor insulation paper, as wrapping materials, clothing liners, diaper liners, in the manufacture of bandages and sanitary napkins, and the like. Melt-blown materials have also been utilized as the filter media used in air filters.

Several processing steps are required to form non-woven filter media using the carding, air laying or wet laying techniques. For this reason, an improvement is needed in the art over these techniques to form filter media that may be adapted for use in air filters used in internal combustion engines. A technique is necessary that uses less equipment and preserves time, energy and money.

SUMMARY OF THE INVENTION

In view of the foregoing disadvantages inherent in the techniques used to create filter media, the present invention provides a method of using a melt-blown process to form filter media adapted for use in IC engine air filters wherein the filter media defines pores having a pore size of between three (3) and twelve (12) microns. The present invention also provides a filter medium adapted for use in IC engine air filters.

Of all of the aforementioned techniques that may be used to form non-woven filter media, the melt-blown process offers advantages described herein. While several processing steps are required to form non-woven filter media using the carding, air laying or wet laying techniques, non-woven material formed using the melt-blown process is formed in one step from a resin to the final melt-blown material. It is therefore advantageous to use the melt-blown technique in forming the filter media used in IC engine air filters because it requires the least amount of equipment, time, energy and money.

In one form of the present invention, a method of making a filter medium adapted for use in an IC engine air filter includes the steps of heating a thermoplastic to form a melt, extruding the melt through a plurality of openings in a die head, directing a stream of heated fluid toward the extruding melt to form a multiplicity of fibers and blowing the fibers toward a moving collection means, the collection means having a surface that includes a three-dimensional profile, collecting the fibers on the surface of the collection means and utilizing the profile to mold the fibers into a resulting filter medium having a pore size of between three (3) and twelve (12) microns. The method also includes the step of removing the filter medium from the profile.

In another form of the present invention, a thermoplastic polymer filter medium is provided. The filter medium is adapted for use in an IC engine air filter and includes a three-dimensional netting defining at least one fold and a plurality of pores having a pore size of between three (3) and twelve (12) microns.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein:

FIG. 3 is an enlarged view of a profile utilized in the method of the present invention to mold the filter medium;

FIG. 4 is a perspective view of a second embodiment of the filter medium of the present invention.

Figure 1:
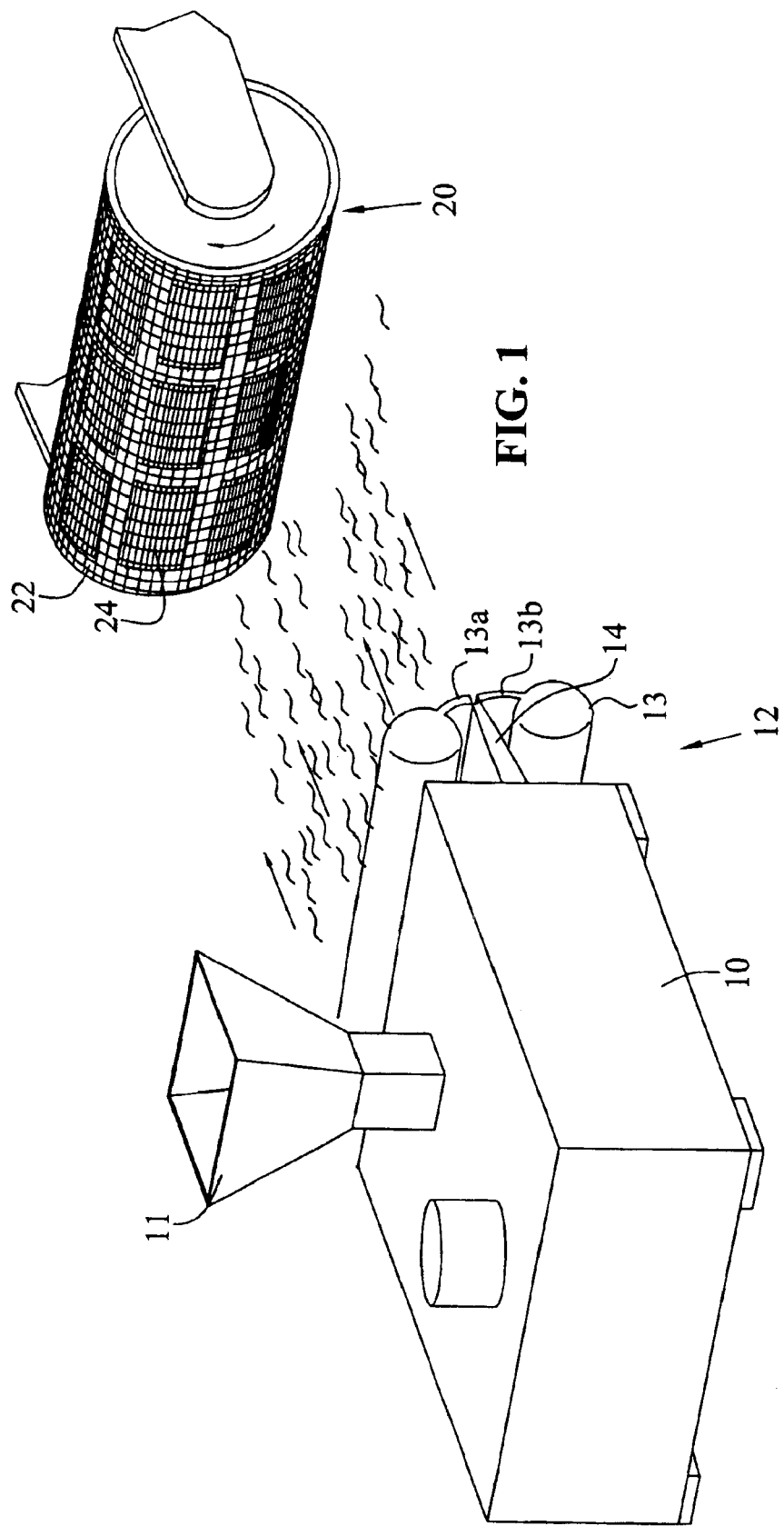
FIG. 1 is a schematic view of one form of the method of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates embodiments of the invention, in several forms, and such exemplifications are not to be construed as limiting the scope of the invention in any manner.

DESCRIPTION OF THE PRESENT INVENTION

The embodiments disclosed below are not intended to be exhaustive or limit the invention to the precise forms disclosed in the following detailed description. Rather, the embodiments are chosen and described so that others skilled in the art may utilize their teachings.

With reference to the drawings, the method of making a filter medium adapted for use in an IC engine air filter using the melt-blown process is illustrated. The use of the term "adapted" hereinafter means that the filter medium is suitable for use in and made to fit the specifications of the IC engine air filter in which it is used. An "IC engine air filter"

is hereinafter defined as an air filter used in an internal combustion engine to filter the air entering the engine. Referring to FIG. 1, one form of the method of the present invention is shown. Extruder 10 includes extruder hopper 11 and a heated barrel containing a screw (not shown). Extruder 10 is in communication with die 12. Die 12 includes feed distribution channel (not shown), die nosepiece 14 and an air manifold 13. Air manifold 13 includes air upper air channel 13a and lower air channel 13b. Air manifold 13 supplies high velocity heated air through upper and lower channels 13a, 13b to die nosepiece 14. This high velocity air is generally generated using an air compressor. Die nosepiece 14 consists of a wide, hollow, tapered housing having a plurality of rows of openings extending across its length.

In accordance with the method of the present invention, a thermoplastic polymer is heated to form a melt. In general, any of the thermoplastic polymers, or mixtures thereof, that are known in the art to be useful in the preparation of melt-blown fibers may be used in the method and the filter medium of the present invention to form a melt. Suitable thermoplastic polymers include polyethylene, polypropylene, nylon 6, nylon 11, polycarbonate, poly 4-methyl pentene-1, polystyrene, and the like. After thermoplastic polymer granules are fed into extruder hopper 11, the granules are fed to the screw rotating within the heated barrel of extruder 10. The rotating of the screw within the heated barrel melts the polymer granules and directs the thermoplastic melt towards die 12. The thermoplastic polymer melt then passes into the feed distribution channel, which controls the flow of the melt to die nosepiece 14. The melt is next extruded through the openings in nosepiece 14. Not shown in FIG. 1 is a metering pump typically used in the melt-blown process to provide uniform melt delivery to die 12.

As the thermoplastic polymer melt is extruded through the openings in nosepiece 14, the heated air streams emerging from upper and lower air channels 13a, 13b of air manifold 13 are directed towards the extruding melt and, upon contact, have the effect of stretching and elongating (i.e., attenuate) the melt emerging from the openings in die nosepiece 14. The attenuation of the melt forms a multiplicity of fibers, the size of which depends on several factors which may include, for example, the characteristics of the thermoplastic polymer used and other factors such as temperature, pressure, air velocity, etc. After being attenuated, the melt-blown thermoplastic fibers are carried by the air streams away from die 12 to laterally spaced collection drum 20.

Collection drum 20 has surface 22 that defines a plurality of apertures and includes multiple three-dimensional profiles 24 spaced apart from each other on surface 22. Shown in an enlarged view in FIG. 3, profile 24 includes a plurality of apertures in a mesh-like arrangement. Profile 24 also defines folds 25 that extend below surface 22 of collection drum 20. As the heated air streams containing the fibers move towards collection drum 20, the air streams pull in a large amount of surrounding air that cools and solidifies the fibers. These solidified, yet flexible, fibers then get deposited in a random orientation on profile 24 of surface 22. As illustrated, the collection drum 20 rotates in a clockwise direction as the fibers are collected on surface 22. A vacuum may be applied to the inside of collection drum 20 to withdraw the hot air from surface 22.

Collection drum 20 may be positioned from die nosepiece 14 as appropriate for the desired fiber deposition. Profile 24 functions to mold the fibers into filter medium 34 as shown in FIG. 4. Filter medium 34 is then removed from profile 24.

Filter medium 34 has folds 35 that correspond with folds 25 of profile 24, and filter medium 34 defines a plurality of pores having a pore size of between three (3) and twelve (12) microns.

In one form of the present invention shown in FIG. 3, surface 22 of collection drum 20 defines profile 24. In this form of the invention, profile 24 is an integral portion of surface 22 and may not be removed from surface 22. After the fibers are collected on profile 24 and profile 24 molds the fibers into filter medium 34, filter medium 34 is either peeled or stamped from surface 22.

In another form of the present invention shown in FIG. 4, profile 24 is attached to surface 22 by an adhesive, hook and loop fastener, or the like. After the fibers are collected on profile 24, profile 24 molds the fibers into filter medium 34. Profile 24 may then be removed from surface 22, and filter medium 34 is removed from profile 24. In this form of the present invention, profile 24 may be shaped differently to mold filter medium 34 into different shapes without altering surface 22 of collection drum 22.

In still another form of the present invention, die nosepiece 14 is movable and collection drum 20 is stationary. In this form of the present invention, collection drum 20 does not rotate as the fibers are blown from nosepiece 14 and deposited in a random orientation on profile 24 of surface 22.

In another form of the present invention, both die nosepiece 14 and conveyor 26 are stationary. In this form of the present invention, the heated air streams emerging from upper and lower air channels 13a, 13b of air manifold 13 may be appropriately angled towards the extruding melt so as to blow attenuated fibers towards surface 28 of collection drum 20.

Figure 2:
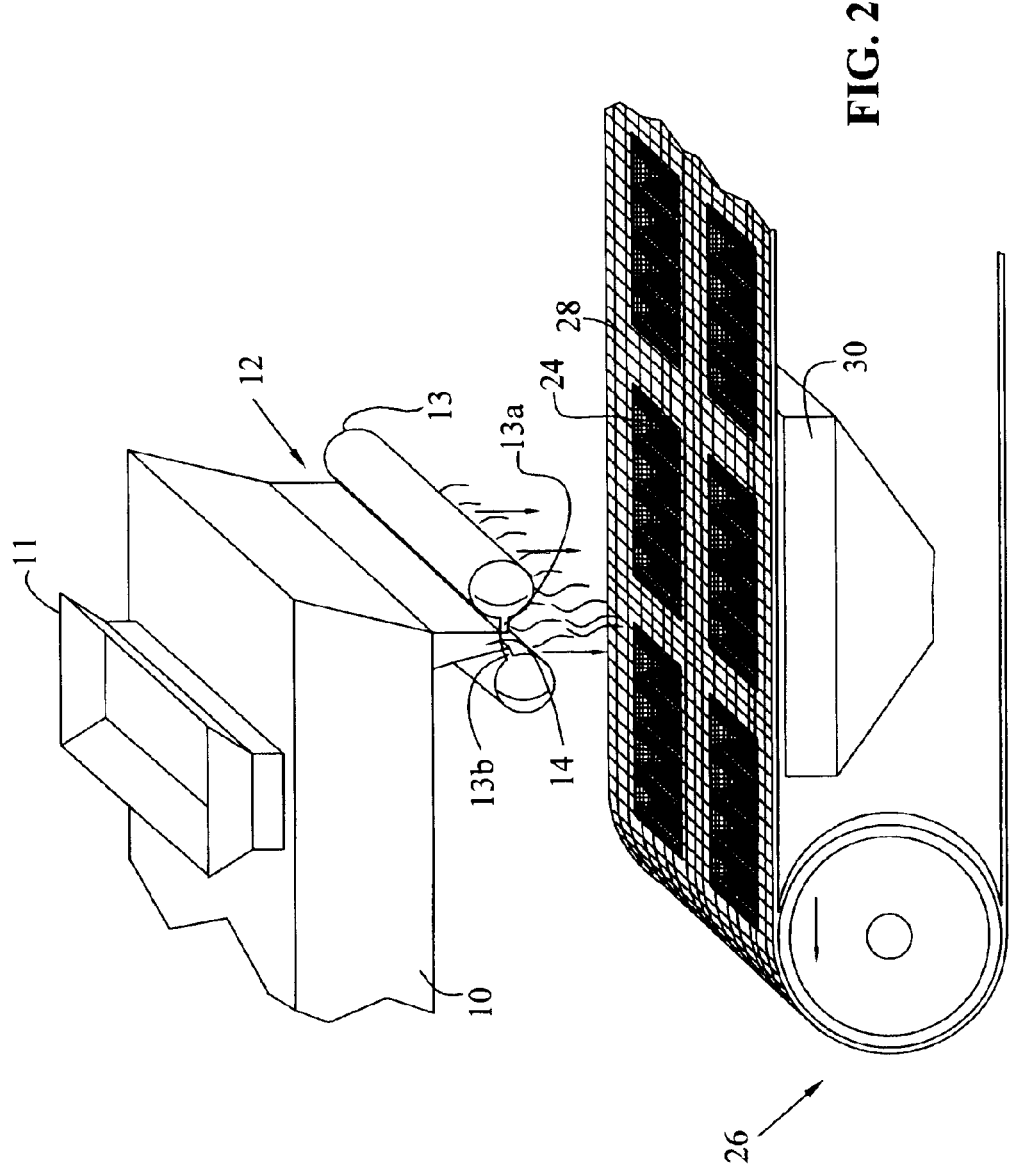
FIG. 2 is a schematic view of a second form of the method of the present invention.

The method of the present invention is again illustrated in FIG. 2. Extruder 10 is both positioned above and vertically spaced apart from conveyor 26. As previously explained, thermoplastic polymer granules are fed into extruder hopper 11 and fed to a rotating screw within the heated barrel of extruder 10. The rotating of the screw within the heated barrel melts the polymer granules and directs the thermoplastic melt towards die 12. The thermoplastic polymer melt then passes into the feed distribution channel and is extruded through the openings in nosepiece 14. Nosepiece 14 extends down from die 10 so as to extrude fibers in a downward direction. As the thermoplastic polymer melt is extruded through the openings in die nosepiece 14, heated air streams emerge from upper and lower air channels 13a, 13b of air manifold 13 and are directed towards the extruding melt. Upon contact with the melt, the air streams attenuate the melt to form a multiplicity of fibers. The melt-blown thermoplastic fibers are then carried downward to conveyor 26.

Conveyor 26 has surface 28 that defines a plurality of apertures and includes multiple three-dimensional profiles 24 spaced apart from each other on surface 28. The heated air streams containing the fibers move towards conveyor 26 and draw in a large amount of surrounding air that cools and solidifies the fibers as they are deposited in a random orientation on profile 24 of surface 28. Conveyor 26 is activated and moves in a westward direction as the fibers are deposited on surface 28. Conveyor 26 may move in an either an eastward or westward direction depending on the placement of extruder 10. While thermoplastic fibers extruded from die nosepiece 14 cool during their travel from nosepiece 14 to conveyor 26, the fibers maintain a sufficient amount of softness and tackiness so that they will adhere and bond to both each other and to profiles 24. Suction box 30 may be applied to the underside of conveyor 26 to withdraw the hot air from surface 28.

Conveyor 26 may be positioned from nosepiece 14 as appropriate for the desired fiber deposition. Profile 24 functions to mold the fibers into filter medium 34 as shown in FIG. 4. Filter medium 34 is then removed from profile 24. Filter medium 34 defines both folds 35 and a plurality of pores having a pore size of between three (3) and twelve (12) microns.

In one form of this method of the present invention, surface 28 of conveyor 26 defines profile 24. Shown in FIG. 3, profile 24 is an integral portion of surface 28 and may not be removed from surface 28. After the fibers are collected on profile 24 and profile 24 molds the fibers into filter medium 34, filter medium 34 is removed from surface 28.

In another form of this method of the present invention, profile 24 (FIG. 4) is attached to surface 28 by an adhesive, hook and loop fastener, or the like. After the fibers are collected on profile 24 and profile 24 molds the fibers into filter medium 34, profile 24 may be removed from surface 28. In this form of the present invention, profile 24 may be shaped differently to mold filter medium 34 into different shapes without altering surface 28 of conveyor 26.

In still another form of the present invention, die nosepiece 14 is movable and conveyor 26 is stationary. In this form of the present invention, conveyor 26 does not move as the fibers are blown from nosepiece 14 and deposited in a random orientation on profile 24 of surface 28.

In yet another form of the present invention, both nosepiece 14 and conveyor 26 are stationary. In this form of the present invention, the hot air streams emerging from the air channels 13a, 13b may be appropriately angled towards the extruding melt so as to blow attenuated fibers towards surface 28 of conveyor 26.

Figure 5:
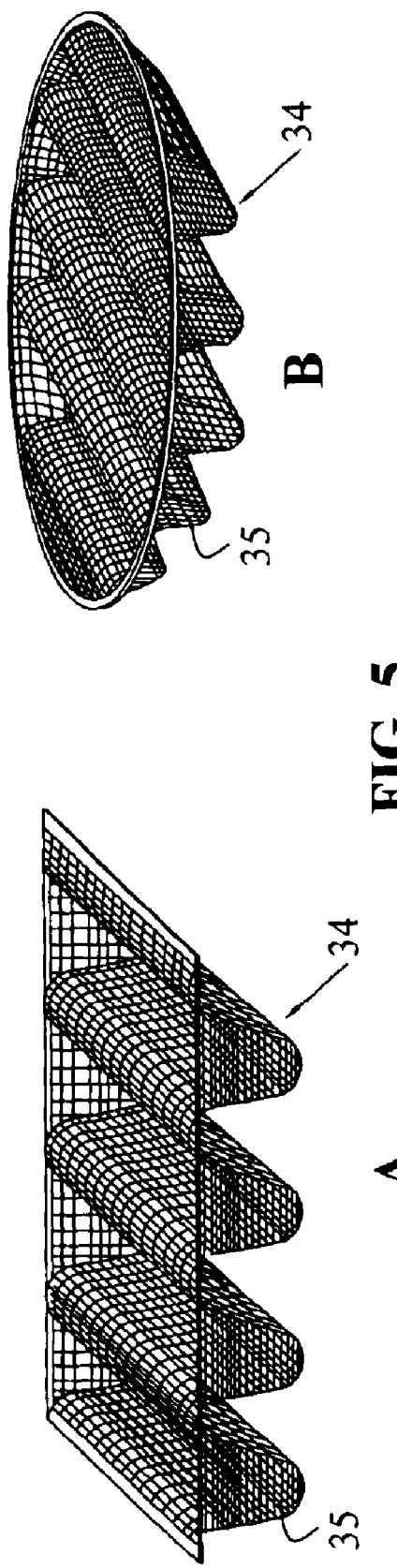
FIG. 5 is a perspective view of alternative embodiments of the filter medium of the present invention.

FIG. 5 illustrates alternative embodiments of filter medium 34 formed as a result of the method of the present invention. Filter medium 34 is a three-dimensional netting material adapted for use in an IC engine air filter. The use of the term "netting" hereinafter refers to a meshed network of fibers. Illustrated in FIG. 5A, filter medium 34 is rectangular in shape. Shown in FIGS. 5B and 5C, filter medium 34 also can be circular or square in shape.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method of making a porous filter medium adapted for use in an internal combustion engine air filter, the method comprising the steps of:

heating a thermoplastic polymer to form a melt;

extruding the melt through a plurality of openings in a die head;

directing one or more streams of heated fluid toward the melt during extrusion to form a multiplicity of fibers and to blow the fibers toward a collection means, the collection means having a surface that includes a three dimensional profile, wherein at least one profile is removably attached to the surface of the collection means, the at least one profile having at least one fold;

collecting the fibers on the surface of the collection means and utilizing the profile to mold the fibers into the porous filter medium, the porous filter medium having at least one fold;

removing the at least one profile from the collection means; and removing the porous filter medium from the at least one profile.

2. The method of claim 1 wherein the porous filter medium defines a plurality of pores having a pore size of between 3 and 12 microns.

3. The method of claim 2 wherein the surface of the collection means defines the at least one profile.

4. The method of claim 1 wherein the collection means is a rotatable drum.

5. The method of claim 4 further including a step of rotating the rotatable drum while collecting the fibers.

6. The method of claim 1 wherein the collection means is a conveyor.

7. The method of claim 6 further including a step of activating the conveyor while collecting the fibers.

8. The method of claim 1 wherein the heated fluid is air.

9. A process for producing a thermoplastic polymer fiber medium adapted for use in an internal combustion air filter, the process comprising the steps of melt-blowing a thermoplastic polymer to form melt-blown fibers, collecting the melt-blown fibers on a collection means having a surface including a three-dimensional profile, utilizing the three-dimensional profile to mold the melt-blown fibers into the thermoplastic polymer fiber medium, the thermoplastic polymer fiber medium defining at least one fold and a plurality of pores having a pore size of between 3 and 12 microns, and removing the thermoplastic polymer fiber medium from the collection means, wherein the step of melt-blowing includes the steps of heating a thermoplastic polymer to form a melt, extruding the melt through a plurality of openings in a die head, directing one or more streams of heated fluid toward the melt during extrusion to form the melt-blown fibers, and blowing the melt-blown fibers toward the collection means, wherein at least one profile is removably attached to the surface of the collection means, the process including the step of removing the at least one profile from the surface, the at least one profile having at least one fold.

10. The process of claim 9 wherein the surface of the collection means defines the three-dimensional profile, the three-dimensional profile having at least one fold.

11. The process of claim 9 wherein the collection means is a rotatable drum.

12. The process of claim 11 further including a step of rotating the drum while collecting the melt-blown fibers.

13. The process of claim 9 wherein the collection means is a conveyor.

14. The process of claim 13 further including a step of activating the conveyor while collecting the melt-blown fibers.

15. The method of claim 9 wherein the heated fluid is air.

* * * * *